(12) United States Patent
Mahajan et al.

(10) Patent No.: US 11,940,237 B2
(45) Date of Patent: Mar. 26, 2024

(54) AUTOMATED GUN BARREL CLEANING SYSTEM AND METHOD THEREOF

(71) Applicant: Griffyn Robotech Pvt. Ltd., Flower Mound, TX (US)

(72) Inventors: Amit Anil Mahajan, Cumming, GA (US); Samir Shriram Bagalkote, Pune (IN)

(73) Assignee: Griffyn Robotech Pvt. Ltd., Maharashtra (IN)

( * ) Notice: Subject to any disclaimer, the term of this patent is extended or adjusted under 35 U.S.C. 154(b) by 0 days.

(21) Appl. No.: 17/947,486

(22) Filed: Sep. 19, 2022

(65) Prior Publication Data

US 2023/0358497 A1   Nov. 9, 2023

(51) Int. Cl.
*F41A 29/02* (2006.01)
*B25J 9/16* (2006.01)
*B25J 11/00* (2006.01)
*F41A 29/04* (2006.01)

(52) U.S. Cl.
CPC ............. *F41A 29/02* (2013.01); *B25J 9/1697* (2013.01); *B25J 11/0085* (2013.01); *F41A 29/04* (2013.01)

(58) Field of Classification Search
CPC ........... F41A 29/00; F41A 29/02; F41A 29/04
See application file for complete search history.

(56) References Cited

U.S. PATENT DOCUMENTS

| | | | |
|---|---|---|---|
| 7,958,664 B2* | 6/2011 | An | F41A 29/02 42/95 |
| 8,567,107 B1* | 10/2013 | Bascue | F41A 29/02 42/95 |
| 9,200,861 B1* | 12/2015 | Kim | F41A 29/02 |
| 2004/0025906 A1* | 2/2004 | Bourrelly | B08B 9/049 134/22.12 |
| 2008/0229644 A1* | 9/2008 | An | F41A 29/00 42/95 |
| 2011/0179592 A1* | 7/2011 | An | F41A 29/04 15/104.09 |

* cited by examiner

*Primary Examiner* — Derrick R Morgan (57) ABSTRACT

Disclosed is an automated gun barrel cleaning system (100) and a method thereof for straight hollow cylindrical objects, preferably gun barrels. The system (100) enables scrubbing, mopping, lubrication and wiping of the gun barrel without the need to remove the cleaning device out of the gun barrel during cleaning and to replace the brush or mopping/wiping cloth. The method of cleaning provides a time-stamped cleaning data to monitor the condition of the gun barrel and to estimate quality and effective service life of the gun barrel. The system (100) comprises of a cleaning device 102 connected to a main controller unit 106 wherein the cleaning device 102 includes drive wheel assembly 210, a driven wheel assembly 240, a spray nozzle assembly 260, a vision system 270 and a cleaning assembly 220 providing controlled scrubbing, mopping and wiping functions with controlled supply of pressurized cleaning agent and lubricant oil.

14 Claims, 6 Drawing Sheets

AUTOMATED GUN BARREL CLEANING SYSTEM AND METHOD THEREOF

RELATED APPLICATIONS

This application claims priority from Indian Patent Application No.: 202221026840 filed on May 9, 2022.

FIELD OF THE INVENTION

The present subject matter relates generally to the field of Inspection and cleaning device, and more specifically, to a vision inspection and automated cleaning of straight hollow cylindrical objects, preferably an internal bore surface of large caliber gun barrels.

BACKGROUND OF THE INVENTION

Large caliber guns are the weapon of choice in the modern battlefield due to their long firing range and increasing accuracy. These are the main ordnance system used in modern artillery and tanks built to launch munitions far beyond the range and power of infantry firearms. A variety of guns systems come under large caliber category, from 76 caliber to 155 caliber artillery and tank guns to variety of mortar and Naval Guns.

For each round fired by this weapon, the gun barrel is subjected to high pressure, temperature, shocks, and friction along with corrosive mixture of gasses and residue generated post combustion of propellants which causes wear and erosion of gun barrel's internal surface.

The wear and erosion is one of several failure mechanisms that affects the operational effectiveness and life of large caliber gun barrels. Firing of ammunition from a gun barrel leads to a lot of undesirable residues of burnt propellants, carbon, copper, inside the barrel that react easily with the metal surfaces inside gun barrel. This process can be accelerated by the high inner temperature of the gun barrel that typically exists after firing. All this leads to accelerate the rate of the wear and erosion of barrel's internal surface if not cleaned regularly. In order to limit the erosion of a gun barrel under normal fringe conditions the gun barrels require regular and effective cleaning to ensure maximum performance and operational readiness.

Although, a lot of efforts have been put into development and modernization of gun systems, relatively the cleaning of the gun barrels is still one of the under explored area. Cleaning the long barrel of large caliber gun is one of the critical tasks that soldier has to perform along with other mission critical tasks on the field.

Currently, in most of the cases, the barrel cleaning is done manually using a brush attached to a long cleaning rod. The main steps used in manual cleaning operation is to soak the brush with a cleaning solution, inserting the cleaning rod into the bore of a barrel, and clean the barrel with repeated forward-backward action. After cleaning with multiple cleaning cycles, the bore must be mopped using the same rod with new cleaning cloth wound on the brush to remove loose sludge and sediments and then lubricated using a fresh cloth soaked in the lubricant oil. Further it should be wiped using another clean cloth to remove excess lubricant. This operation takes hours to clean, mop, lubricate and wipe the gun barrel before it ready for action.

The manual cleaning involves multiple individuals simultaneously repeating the horizontal forward & backward movement of a cleaning rod at approximately their shoulder height for a long period of time. Such a posture is difficult to maintain from an ergonomic point of view. Moreover, manual cleaning is not effective, as simple pushing of the cleaning rod without spiral movement results in uneven contact between the cleaning brush and the gun barrel surface which cannot remove sludge especially in case of riffled barrel grooves. Also, due to limited visibility of manual inspection by bare eyes, it is difficult to judge if the surface is cleaned or not or requires additional cleaning. Thus, manual cleaning method is inconsistent, irreproducible, highly laborious, time consuming and subjective in nature.

Various methods disclosed in the prior art that describe semi-automatic and automatic motorized cleaning devices to solve the above-mentioned problems in manual cleaning of gun barrels. Many of such devices comprises electrically or pneumatically powered rotating and reciprocating brush along with spraying of cleaning agent followed by mopping, lubrication and wiping the gun barrel. Each cleaning step is carried out by intermittently removing the device out of the barrel and replacing the new cleaning cloth after each cleaning cycle. In few cases, it is also required to replace the brush heads and wipes in a single cleaning operation in order to get the desired cleaning results. So although the device cleaning functions are automated there requires and manual intervention to taking out the cleaning device out of the gun barrel and replace either brushes or cleaning cloths intermittently during cleaning operations, thus the operation may not be considered fully automatic. The other limitation for the existing cleaning devices is that they are suitable only for specific caliber barrels. The cleaning solution used to lose out the residues and sludges may react with barrel material and can cause pitting and erosion if exposed for long time. Excessive use of cleaning solutions and Excessive lubricants may have adverse effect on bore surface. So optimized use of these chemicals is one of the crucial requirements.

Moreover, to assess the quality of cleaning, a few methods described in the prior art utilize a camera attached to the cleaning device to view the cleaned surface. The operator can view the real-time video or images of barrel surface and can judge the cleaning performance. In case any uncleaned area is observed, the operator can decide to repeat the cleaning operation. For this he can operate the device in manual mode in order to get the desired cleaning performance. Thus although the camera is used to view the bore surface it ends up with a camera assisted manual inspection only. The judgment of cleaning performance is based on operator's skills and experience and is quite subjective. Moreover traceability of records of cleaning operation and associated data of before and after cleaning could be time consuming and error prone in case of manual data feeding.

Cleaning and inspection is a crucial aspect of maintenance activity of large caliber guns. Cleaning and inspection has to be performed before and after firing and also during the guns not in use to keep the equipment ready for action till its useful service life.

Accordingly, there exists a need to provide a gun barrel cleaning device that can overcome the drawbacks in the prior art.

The main objective of the invention is to automate scrubbing, mopping, lubrication and wiping of the entire bore surface of gun barrel without the need to remove the device out of the gun barrel during cleaning to replace the brush or mopping or wiping cloth.

Yet another objective of invention is to optimize the use of cleaning solution and lubricants to limit the corrosive effect of cleaning solution and to prevent over lubrication.

Yet another objective of the invention is to provide quick and easy replacement of worn-out brush heads without the requirement of dismantling the device after prolonged use.

Yet another objective of invention is to provide quick and easy replacement of disposable wiping cloth after use.

The other objective of the invention is to scan the bore surface before and after cleaning to assess the cleaning performance.

Yet another objective of the invention is to localize the uncleaned patch, if any, after completion of main cleaning cycle and pass-on the coordinates of location of uncleaned patch in the barrel to a controller which then initiate second cycle of cleaning on the uncleaned patch selectively.

Yet another objective of automatic inspection is to inspect the barrel bore surface as a safety assessment for detection, localization and measurement of any surface defects present on the bore surface, wherein the surface defects can be pits, erosion, wear, scratches, dents or cracks.

SUMMARY OF THE INVENTION

Embodiments of the present disclosure present technological improvements as solutions to one or more of the above-mentioned technical problems.

Before the present subject matter relating to inspection and cleaning device, it is to be understood that this application is not limited to the particular system(s) and methodologies described, as there can be multiple possible embodiments which are not expressly illustrated in the present disclosure. It is also to be understood that the terminology used in the description is for the purpose of describing the implementations or versions or embodiments only and is not intended to limit the scope of the present subject matter.

This summary is provided to introduce aspects related to an inspection and cleaning of internal surface of straight hollow cylindrical objects, preferably a gun barrel. This summary is not intended to identify essential features of the claimed subject matter nor is it intended for use in determining or limiting the scope of the present subject matter.

In one aspect, a system automated inspection and cleaning of internal surface of straight hollow cylindrical objects, preferably a gun barrel, is disclosed. The system comprises a robotic inspection and cleaning device connected to a main controller unit in wired or wireless manner, providing means of command and control of the robotic inspection and cleaning device. In an embodiment, the main controller unit consists of a microcontroller; a main computer having a central processing module, a graphical processing module, a memory storage module; and a means of graphical user interface to select the switching, speed controlling and overall programming of the inspection and cleaning operations of the cleaning device. The robotic inspection and cleaning device is essentially a cylindrically shaped vehicle body comprising a drive wheel assembly, a driven wheel assembly, a spray nozzle assembly, a vision system and a cleaning assembly.

The drive wheel assembly driven by an electrical motor and controlled and operated by the main controller unit is biased towards one end of the cleaning device and fitted within a casing. The driven wheel assembly fitted within the casing is biased towards other end of the cleaning device. The drive wheel assembly and the driven wheel assembly are having a twisted wheel with outer rim thereof in contact with the inner wall of the gun barrel for driving the cleaning device linearly along the length of gun barrel while rotating spirally on its own axis. The spray nozzle assembly is attached next to the driven wheel assembly and operably connected to the main controller unit. The spray nozzle assembly is having a plurality of outlet spray nozzles and an inlet connector mounted radially on a spray nozzle manifold. The spray nozzle assembly receives a cleaning liquid and a lubricating oil respectively from a cleaning liquid reservoir C and a lubricating oil reservoir L fitted externally. The vision system is attached to the front end of the cleaning device and operably connected to the main controller unit. The vision system fitted with a means for capturing images and real time video footage of inner wall of gun barrel. The cleaning assembly consists of a scrubbing unit, a mopping unit and a wiping unit wherein the scrubbing unit and the mopping unit are loosely coupled on a slider unit and mounted coaxially with respect to the cleaning device on a mounting bracket and operably connected to a jagging subassembly for a controlled reciprocating action thereof. The wiping unit is biased to the other end of cleaning device and it is attached next to the spray nozzle assembly. Each of the scrubbing unit, the mopping unit and the wiping unit is having a plurality of brush units mounted thereon in a sliding slot of the sliding element by means of a slider pin and a guiding pin. The brush units are slidingly opened and closed by a brush actuation motor and a reduction gear train arrangement mounted on other side of the brush unit mounting bracket. A detachable cloth cap of a stretchable oil and liquid absorbing material is provided for covering the brush heads wherein the brush unit corresponding to a specific operation selected from scrubbing, mopping and wiping is radially opened and closed with respect to axis of the cleaning device by sliding motion of the brush unit with respect to the direction of rotation of a slotted disk cam.

In another aspect, the present invention provides a method for inspection and cleaning of straight hollow cylindrical objects, preferably a gun barrel, for generating a time-stamped cleaning data to monitor the condition of the gun barrel and to estimate quality and effective service life of the gun barrel. The cleaning device is first connected to a main control unit and inserted inside the gun barrel. A drive assembly is then powered ON to drive the cleaning device along the length of gun barrel while rotating spirally on its own axis and acquiring a plurality of pre-cleaning images of an inner wall of the gun barrel at plurality of sections travelled by the cleaning device and simultaneously spraying a pressurized cleaning liquid radially on the inner wall of the gun barrel. The pre cleaning images of inside of gun barrel are stored in a memory storage module of the main controller unit. The plurality of brush units of a scrubbing unit are then opened to press radially to the inner wall of the gun barrel and the scrubbing unit is linearly reciprocated at a high frequency for wet scrubbing of the inner wall of the gun barrel to remove the sludge. A pressurized lubricant oil is then spread radially on inner wall of the gun barrel by linearly driving the cleaning device inside the gun barrel. The plurality of brush units of a wiping unit and a mopping unit along with the lint free stretchable cloth cap are then opened to press radially to the inner wall of the gun barrel for mopping the sludge and wiping the excess lubricating oil, wherein the mopping and wiping is achieved by a twisted linear motion of the cleaning device. A plurality of post-cleaning images of inner wall of the gun barrel are acquired at plurality of sections travelled by the cleaning device, by driving the cleaning device inside the gun barrel linearly along the length of gun barrel while rotating spirally on its own axis and the post-cleaning images are stored in the memory storage module of the main computer. The pre-cleaning and post cleaning images are analyzed and processed with a central processing module and a graphical processing module to derive the cleaning performance and to detect the uncleaned area. Then a selective cleaning sequence of scrubbing, mopping and wiping is generated to clean the uncleaned patches and a report of cleaning operation to provide cleaning status of barrel and indicate the presence of any surface anomaly on the inner wall of the gun barrel is generated.

The system and method for automated inspection and cleaning of internal surface of straight hollow cylindrical objects, preferably a gun barrel, thus achieves scrubbing, mopping, lubrication and wiping of the entire bore surface of gun barrel without the need to remove the device out of the gun barrel during cleaning and to replace the brush or mopping/wiping cloth. Method of automatic inspection and cleaning of gun barrel bore surface provides a safety assessment for detection, localization and measurement of any surface defects present on the bore surface.

DETAILED DESCRIPTION OF THE EMBODIMENTS

The foregoing objects of the invention are accomplished and the problems and shortcomings associated with prior art techniques and approaches are overcome by the present invention described in the present embodiments.

In order to solve the problems depicted in background and to provide technological solutions for the limitation in prior arts a new smart inspection and cleaning device is proposed. In one of the embodiments of the present disclosure, is automatic inspection and cleaning system that comprises a robotic inspection and cleaning device connected with main control cable to a main controller unit. The robotic inspection and cleaning device is essentially a cylindrically shaped vehicle body comprising a main drive assembly biased towards one end of the said device, a cleaning assembly, of which, one end is attached to the drive assembly, a driven wheel assembly attached to the other end of cleaning assembly, a spray nozzle assembly attached to the device next to the driven wheel assembly, a wiping assembly biased to the other end of device and a vision system attached to the other end of the device. As described above in the background, the gun barrel bore cleaning involves a wet scrubbing to loose-out the combustion residue, carbon and other sediments adhered to bore inner surface, mopping of the loose sludge, short term or long term preservation of gun barrel by applying gun lubricant oil on cleaned barrel surface and wiping off the excess gun lubricant oil in order to protect the barrels bore surface from corrosion.

The foregoing detailed description of embodiments is better understood when read in conjunction with the appended drawings. For the purpose of illustrating the disclosure, there is shown in the present document example constructions of the disclosure; however, the disclosure is not limited to the specific system/apparatus or method disclosed in the document and the drawings.

The present disclosure is described in detail with reference to the accompanying figures. In the figures, the leftmost digit(s) of a reference number identifies the figure in which the reference number first appears. The same numbers are used throughout the drawings to refer various features of the present subject matter.

In the above accompanying drawings, a non-underlined number relates to an item identified by a line linking the non-underlined number to the item. When a number is non-underlined and accompanied by an associated arrow, the non-underlined number is used to identify a general item at which the arrow is pointing.

Further, the figures depict various embodiments of the present subject matter for purposes of illustration only. One skilled in the art will readily recognize from the following discussion that alternative embodiments of the structures and methods illustrated herein may be employed without departing from the principles of the present subject matter described herein.

The reference numbers in the accompanying drawings and the corresponding component are listed in the Table below:

TABLE

| Ref No: | Component |
|---|---|
| 100 | Automated gun barrel cleaning system |
| 102 | Robotic inspection and cleaning device |
| 104 | Main control cable |
| 106 | Main controller unit |
| 210 | Drive wheel assembly |
| 215 | Outer casing |
| 220 | Cleaning assembly |
| 220s | Scrubbing unit |
| 220m | Mopping unit |
| 220w | Wiping unit |
| 240 | driven wheel assembly |
| 260 | Spray nozzle assembly |
| 270 | Vision assembly |
| 280 | Proximity Sensor |
| 310 | Jagging motor |
| 320 | Connecting rod |
| 330 | Jagging frame |
| 340 | Connecting member |
| 350 | Slider unit |
| 360a, 360b | mounting brackets |
| 370 | Jagging subassembly |
| 510 | Brush actuation motor |
| 520 | Reduction gear train |
| 530 | Brush unit mounting bracket |
| 540 | Brush unit |
| 610a, 610b | Slotted disk cams |
| 620 | Hollow shaft |

TABLE-continued

| Ref No: | Component |
| --- | --- |
| 630 | Sliding element |
| 640 | Guiding pins |
| 650 | Sliding slots |
| 660 | Slider pins |
| 670 | Linear brush bearing |
| 680a, 680b | Brush heads |
| 710 | Cloth cap |
| 810 | Spray nozzle manifold |
| 820 | Outlet spray nozzles |
| 830 | inlet connector |

Referring to the FIGS. 1 to 10, an automated system 100 for inspection and cleaning of straight hollow cylindrical objects, such as a gun barrel, (herein after referred to as "the system (100)") is shown in accordance with the present claimed subject matter is shown. In an embodiment, the system 100, comprises a robotic inspection and cleaning device 102 connected to a main controller unit 106 in a wired or wireless manner. Now each unit will be described in detail with the help of figures.

Figure 2:
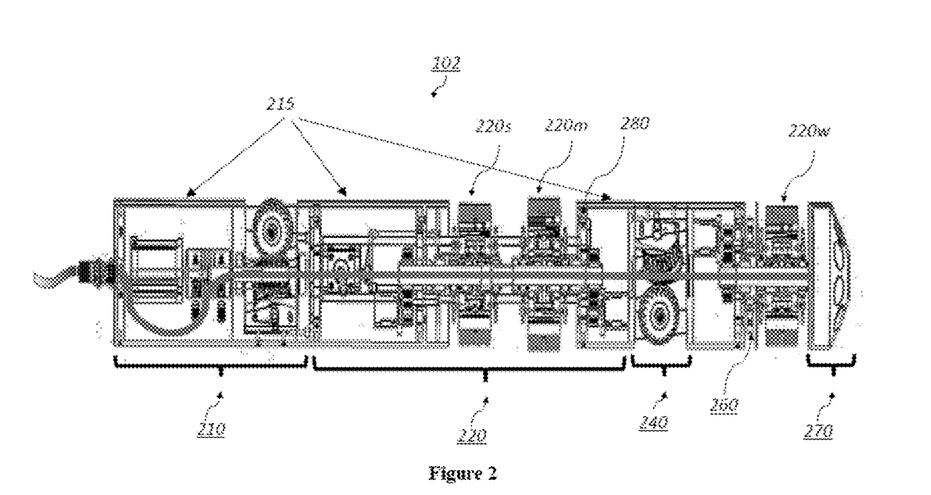
FIG. 2 is a cut view of a robotic inspection & cleaning device, in accordance with the present invention.

Now referring to FIG. 2, the robotic inspection and cleaning device 102, hereinafter referred as "the device 102", is essentially a cylindrically shaped vehicle body comprising a drive wheel assembly 210 biased towards one end of the device 102, a driven wheel assembly 240 biased to the other end of device 102, a spray nozzle assembly 260 attached to the device 102 just next to the driven wheel assembly 240, vision system 270 attached to the other end of the device 102 and a cleaning assembly 220 consisting of a scrubbing unit 220s, a mopping unit 220m and a wiping unit 220w of which the scrubbing unit 220s and the mopping unit 220m are attached to the drive assembly 210 and the wiping unit 220w is attached next to the spray nozzle assembly 260.

The drive wheel assembly 210, can essentially be any locomotion arrangement to drive the device 102 inside the bore of gun barrel. The drive assembly 210, can be a wheel assembly driven by electrical motor directly or with a combination of gear train or belt drive or any suitable arrangement known in the art. The description provided hereafter for the drive assembly 210 is just one of the embodiment purposes only. In the current embodiment, the drive assembly 210 comprises of a worm gear and worm wheel gear arrangement, wherein a plurality of worm wheel gears radially spaced apart in equal intervals are engaged on a hollow shaft worm gear. The hollow shaft worm gear is mounted concentrically in the outer casing 215. The plurality of wheels are coupled to each worm wheel gear, and can be rolled by the rotation force transferred from the worm gear. The worm gear is rotated by means of reduction gears driven by an electrical servo motor. The wheels are little protruded out from the outer casing 215, and are arranged in such a way that the outer rim of wheels is in contact with inner wall of gun barrel in case of smooth bore gun barrel and may be engaged in the grooves in case of riffled bore barrel. In both the cases the angle of wheels is kept such a way that the device 102, displaces linearly along the length of barrel while it rotates spirally on its own axis, wherein the angle of twist is adjusted to length of barrel in case of smooth bore and it matches the angle of twist of the riffling in case of riffled barrel while engaged into the grooves. Similar arrangement is proposed for a driven wheel assembly 240 biased towards other end of the cleaning device 102, wherein the driven wheels are just for balancing purpose only and are arranged similar to the arrangement described for drive assembly 210, without the worm and worm wheel gears.

Figure 9:
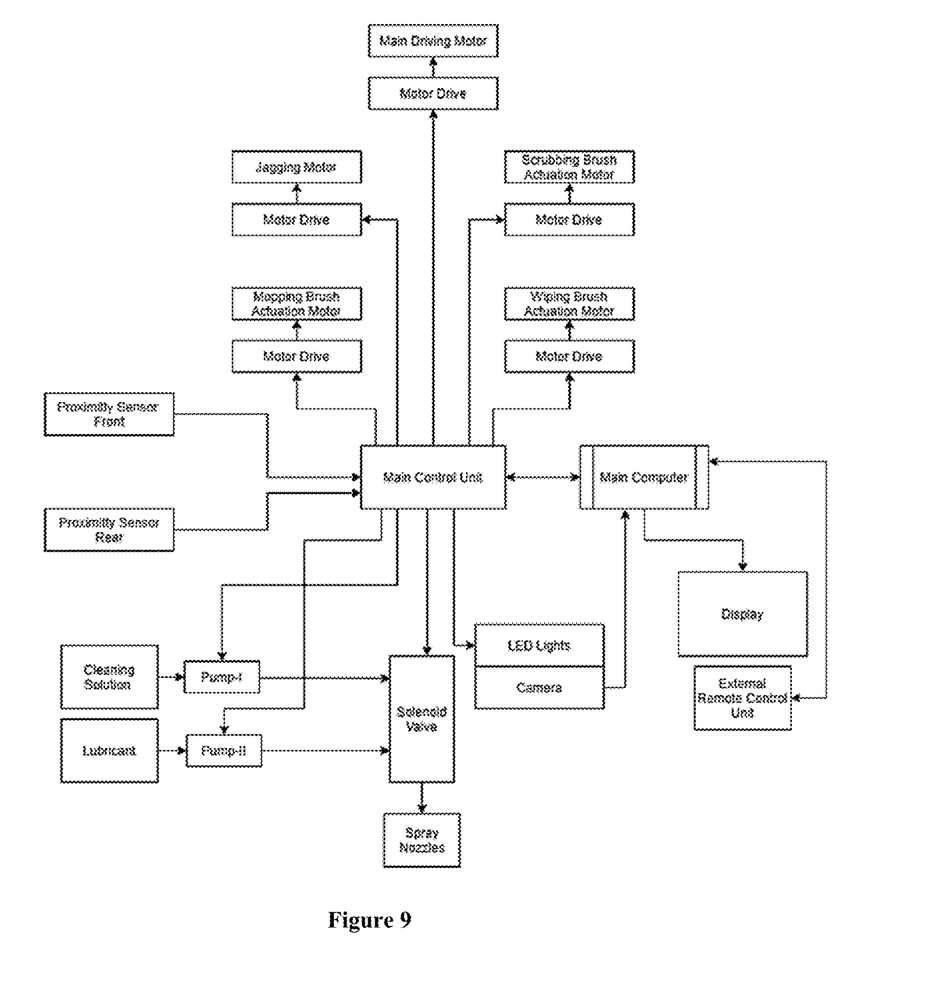
FIG. 9 is a closer view of spray nozzle assembly of cleaning device, in accordance with the present invention.

The spray nozzle assembly 260 is attached to the device 102 just next to the driven wheel assembly 240. Referring to FIG. 2 and FIG. 9, the spray nozzle assembly 260 comprises a spray nozzle manifold 810, a plurality of outlet spray nozzles 820 mounted radially on the spray nozzle manifold 810. The spray nozzle assembly 260 receives a cleaning liquid and a lubricating oil respectively from an externally fitted cleaning liquid reservoir C and a lubricating oil reservoir L, through an inlet connector 830.

The vision system 270 is attached to the front end of device 102, wherein the vision system comprises of a vision camera and LED lights (not shown explicitly) that provides a means to capture images of inner wall of barrel or record a video or to provide a real time video footage indicating current status of cleaning.

Figure 3:
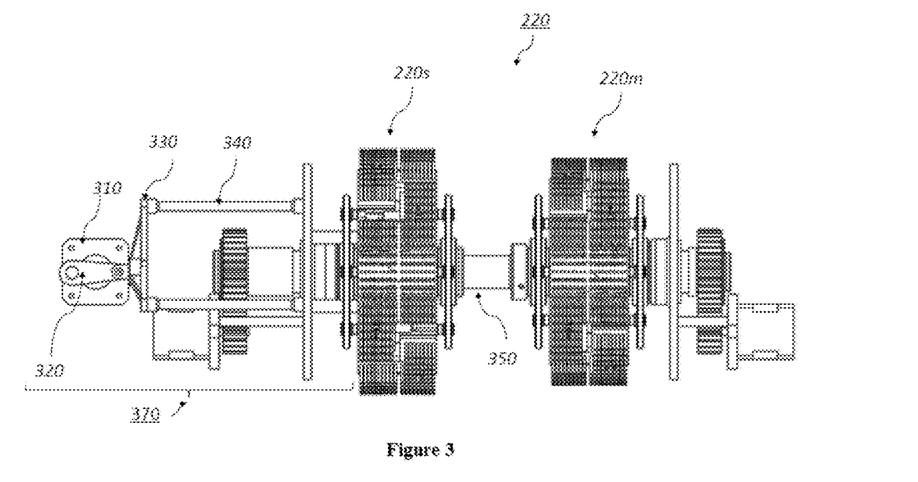
FIG. 3 is a close-up view of cleaning sub-assembly of the robotic inspection & cleaning device, in accordance with the present invention.
Figure 4:
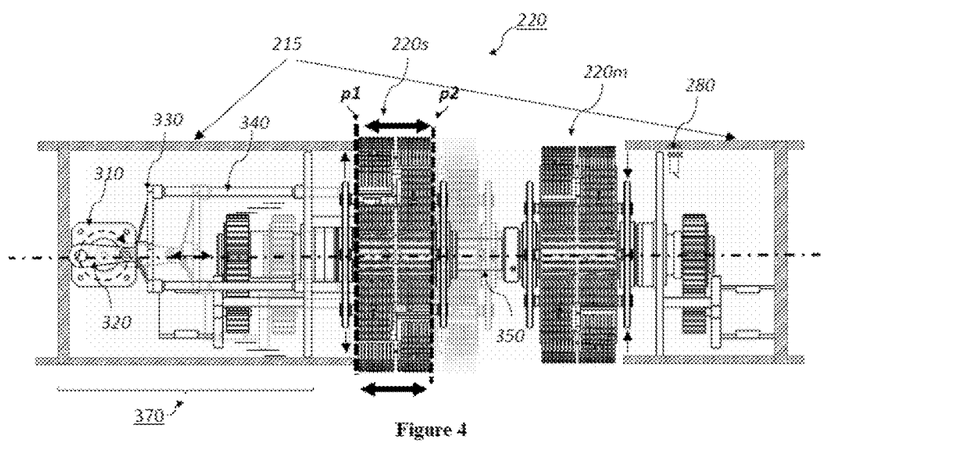
FIG. 4 is an illustration of jagging action of scrubbing brush assembly of the robotic inspection & cleaning device, in accordance with the present invention.

Now the following section will describe details of the cleaning assembly 220. FIGS. 3 & 4 shall be referred to understand the detailed arrangement of the cleaning assembly 220. FIG. 3 shows a close-up view of the cleaning assembly 220. The scrubbing unit 220s and the mopping unit of the cleaning assembly 220 are mounted coaxially with respect to the device 102, on a mounting bracket 360a and 360b respectively. The scrubbing unit 220s and the mopping unit 220m are loosely coupled on a slider unit 350. The mounting bracket 360a and 360b are radially attached to the outer casing 215 from inside. The cleaning assembly 220 further comprises of a jagging subassembly 370, wherein the jagging subassembly 370, comprises of a jagging frame 330, a plurality of connecting member 340, of which a one end is attached to jagging frame 330 and other end attached to the mounting bracket 360a. The jagging frame 330 is attached to a connecting rod 320 that is rotated by a jagging motor 310. The entire jagging subassembly 370 is mounted on plurality of tie-bars (not shown in the image).

Now following section will describe the construction of the units 220s, 220m and 220w for scrubbing, mopping, and wiping respectively. The scrubbing, mopping, and wiping units (220s, 220m and 220w) are also referred as the scrubbing, mopping, and wiping brush assemblies (220s, 220m and 220w) respectively in the document. The construction of scrubbing, mopping, and wiping units/brush assemblies can be well understood when read along with FIGS. 5 and 6.

Figure 5:
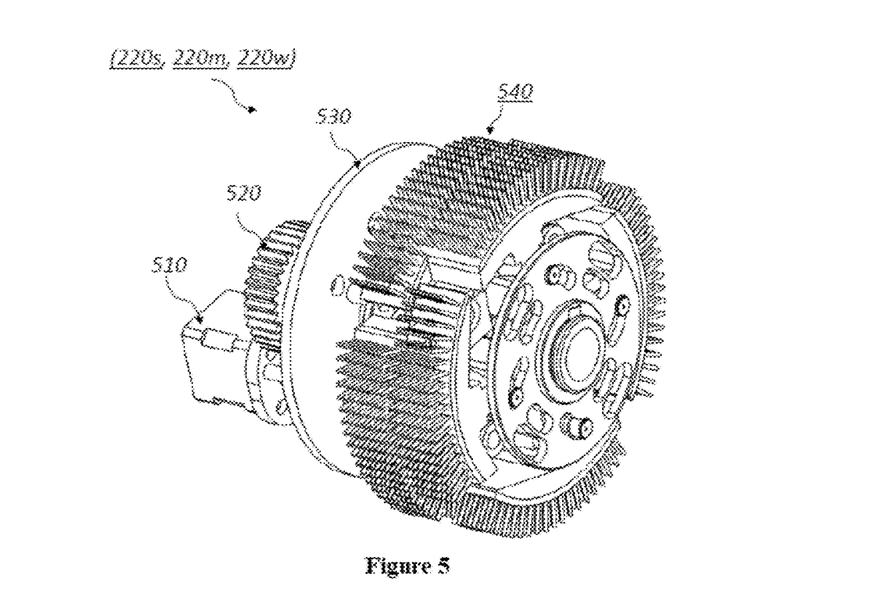
FIG. 5 is a close-up view of scrubbing, mopping and wiping brush assembly of the robotic inspection & cleaning device, in accordance with the present invention.

FIG. 5 illustrates the isometric view of brush assembly, which has a common design as of the scrubbing brush assembly 220s, the mopping brush assembly 220m and a wiping brush assembly 220w. For simplifying the reading in this section the brush assemblies for scrubbing, mopping and wiping, 220s, 220m and 220w respectively are hereafter be read simply as the brush assembly.

Figure 6:
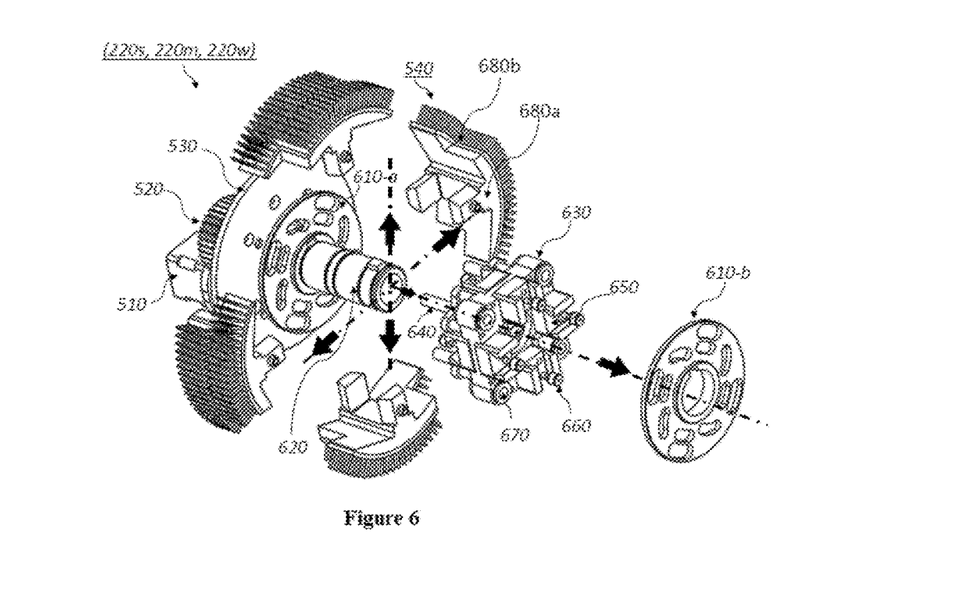
FIG. 6 is a disassembled view of the brush assembly, in accordance with the present invention.

Referring to FIGS. 5 and 6, the brush assembly comprises of a plurality of brush units 540 that are radially open or close as per need with respect to axis of device 120. The brush unit are mounted in a plurality of sliding slots 650 of a sliding element 630, wherein the sliding element 630 is attached on a hollow shaft 620, to which a slotted disk cam 610a and 610b are attached to either sides of the sliding element 630. The brush units 540 are attached to the sliding element 630 by means of a plurality of slider pins 660 and a plurality of guiding pins 640. The brush unit opens or closes by sliding motion of brush unit 540, with respect to the direction of rotation of the slotted disk cam 610a and 610b. For example when the slotted disc cams 610a and 610b rotate clockwise the brush units slides outward radially to open and when the slotted disc cams 610*a* and 610*b* rotate counterclockwise the brush units slides inward radially to close. The rotation of the disc cam is achieved by rotating the hollow shaft 620, driven by a brush actuation motor 510 and a reduction gear train 520, mounted on a brush unit mounting bracket 530. Thus, during a specific operation like for example, scrubbing, or mopping or wiping the brush assembly corresponding to the specific operation is in open state while other brush assemblies are in close state.

The entire cleaning operation is divided in four steps viz, wet scrubbing, mopping, lubrication, and wiping. The first step of cleaning is wet scrubbing. For this the cleaning solution is sprayed radially inside the barrel surface by means of the spray nozzle assembly 260. The cleaning liquid is pumped from external cleaning liquid reservoir C in FIG. 1, via a tubing that carries the cleaning liquid to a solenoid valve (not shown) controlled by a pump and valve controller from where is further fed to the spray nozzle manifold 810 at the inlet connector 830. A pressurized cleaning liquid is then sprayed over entire inner wall of barrel. The cleaning liquid reacts with the combustion residue and carbon and other undesirable material and unbinds it from the barrel surface. The sludge thus produced can now be easily scrubbed out by a reciprocating action of brush assembly 220*s*. The scrubbing action involves opening the scrubbing brush unit 540 which is strongly pressed radially to the inner wall of barrel and linearly pushed forward and backward at a high frequency by means for reciprocating action of the jagging subassembly 370 as can be seen in FIG. 4. In FIG. 4 the entire scrubbing brush assembly 220*s* is moved forward and backward at a high frequency, comprising a stroke from p1 to p2. The complete forward and backward stroke is achieved by one complete rotation of the connecting rod 320, driven by a jagging motor 310. The speed of jagging can be controlled programmatically as per requirement.

After scrubbing steps comes mopping, lubrication and wiping steps. With a specific arrangement of the mopping brush assembly 220*m*, the spray nozzle assembly 260 and wiping brush assembly 220*w* a simultaneous mopping, lubrication and wiping can be achieved.

Figure 7:
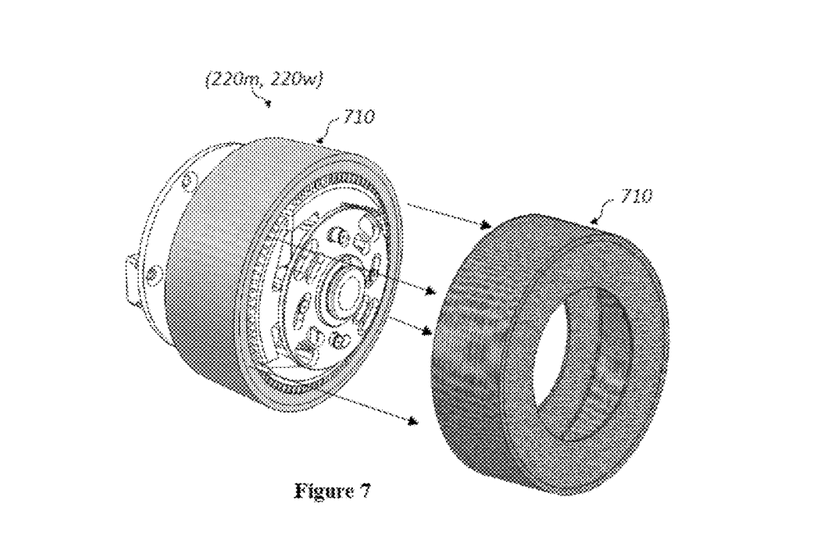
FIG. 7 is a disassembled view of brush assembly indicating brush mount and brush head, in accordance with the present invention.
Figure 8:
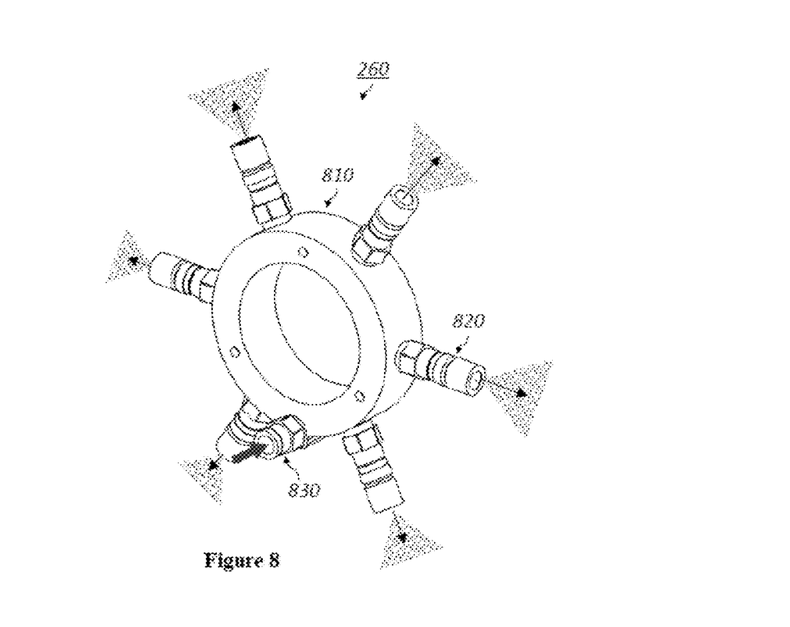
FIG. 8 is a closer view of mopping and wiping brush assembly with easy detachable lint free cloth cap, in accordance with the present invention.

The mopping and wiping brush heads 680 in FIG. 6 are coved by putting disposable lint free stretchable cloth cap 710 as in FIG. 7, wherein the lint free stretchable cloth cap 710 can be easily attached or detached with the help of elastic band provided at the rim (not shown). The lint free stretchable cloth cap 710 can be made up of any oil or liquid absorbing material that is stretchable. Due to its elastic properties, the cap 710 can take the shape of brush whether it is open or close.

Figure 1:
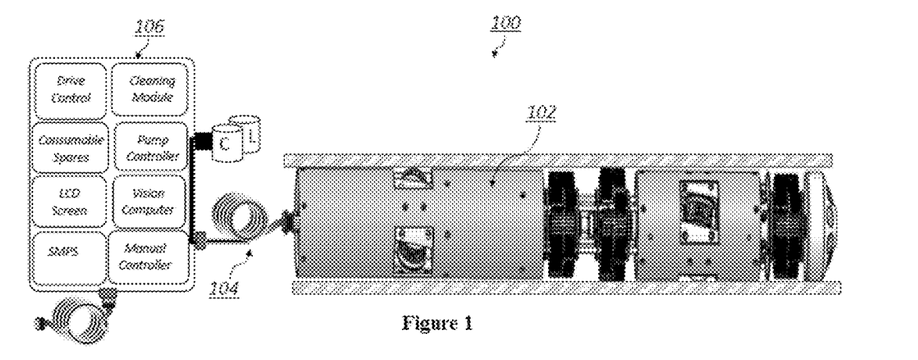
FIG. 1 is an illustration of automated gun barrel cleaning system, in accordance with the present invention.

Similar to cleaning liquid spray, the gun lubricant oil is pumped from external lubricating oil reservoir L in FIG. 1, via a tubing that carries the Lubricant oil to a solenoid valve (not shown) controlled by a pump and valve controller from where is further fed to the spray nozzle manifold 810 at the inlet connector 830. A pressurized lubricant oil is then uniformly sprayed over entire inner wall of barrel.

The mopping of sludge and wiping of excess lubricating oil is achieved by opening the mopping and wiping brush units 540, along with the lint free stretchable cloth cap 710, which is strongly pushed against the inner wall of barrel. The mopping and wiping is achieved by a twisted linear motion of device 102, while the mopping and wiping brush unit 540 are radially open and press against inner wall of barrel.

All the cleaning steps and the cleaning speed can be programmatically set with the help of the main control unit 106 in FIG. 1. The cleaning device 102 is connected to the main controller unit 106 in a wired or wireless manner. In an embodiment, the cleaning device 102 is connected to the main controller unit 106 with a connecting cable 104. The main control unit 106 comprises of a microcontroller, a main computer and a digital or analog input-outputs as shown in FIG. 9, where FIG. 9 shows a general system architecture of main control unit. The controller is powered either by an AC supply or DC power supply through portable battery or directly from the carrier vehicle of gun system. The main computer comprises of a central processing unit and a graphical processing unit and a memory storage device. The main computer provides a means of command and control of the device 102. A display screen mounted on the main control unit provides a means of graphical user interface to select the switching, speed controlling and overall programming of the inspection and cleaning operations of the device.

The images captured by the vision system 270 are stored in a memory of the main computer and are used for image processing and image analysis to detect cleaned and uncleaned areas of inner wall of barrel or to identify any surface defects, localize the defect in the barrel and label it with the use of deep learning neural network based image processing module of the graphical processing unit and the central processing unit. The computational neural network based deep leaning modules are trained with a set of image data comprising cleaned and uncleaned images of inner wall of barrel and also sample images of erosion, wear, and surface defects on inner wall of barrel. The trained module provides the means of comparison of cleaned and uncleaned area of inner wall of barrel and also able to detect, identify and localize the surface defects present on inner wall of barrel.

Figure 10:
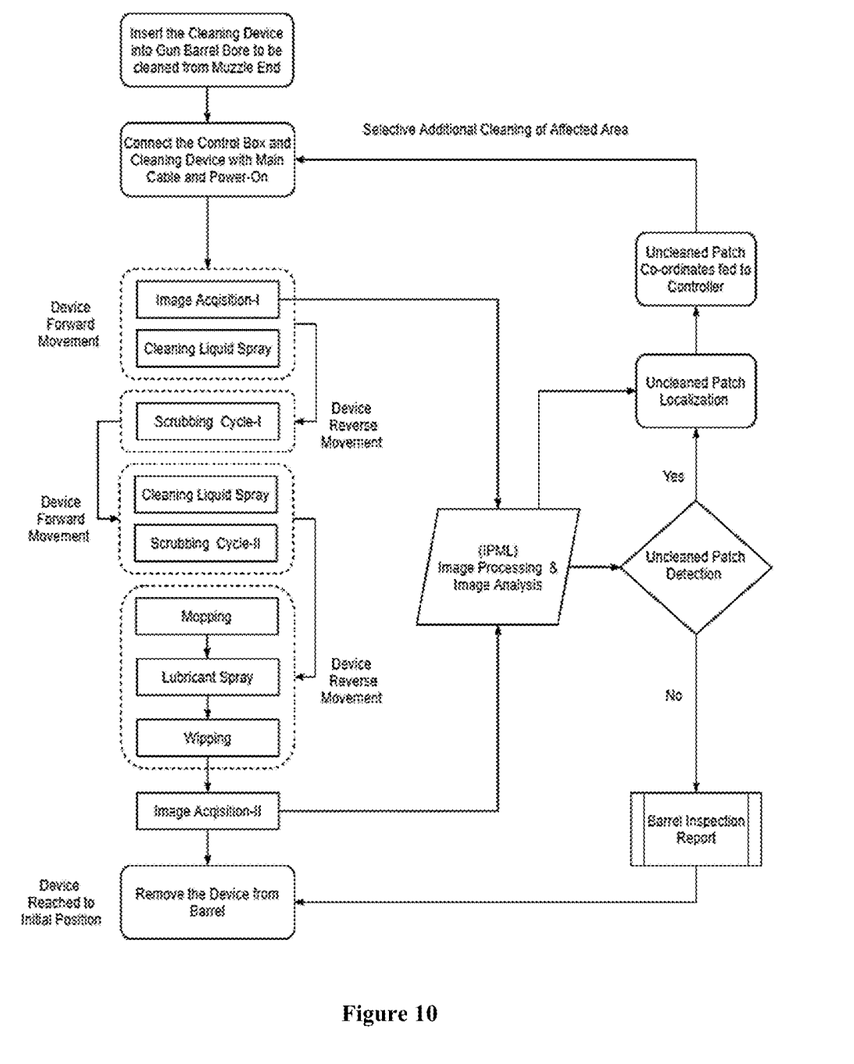
FIG. 10 is a block diagram of inspection and cleaning device control system, in accordance with the present invention.

In a preferred embodiment, the overall automatic inspection and cleaning process flow of the device is explained in conjunction with FIG. 10. Referring to FIG. 10, the inspection and cleaning operation of the device commenced by inserting the device into the gun barrel bore from muzzle end. Once inserted the device 102, into the barrel and connected to the main control unit 106, using a main control cable 104, and powered on the drive assembly 210 of the device 102 starts with a trigger of proximity senor.

The first cycle of the device 102 rolling inside the barrel is to acquire plurality of images of inner wall of the barrel by the camera at plurality of sections travelled by the device 102, inside the barrel; and simultaneous spraying of cleaning liquid radially on the inner wall of barrel. The images acquired before cleaning are stored in the memory of the main computer.

Two passes of wet scrubbing along with cleaning liquid spray of entire inner wall of barrel ensure detachment of sludge and removal of combustion residue and other undesirable material from inner wall of the barrel.

The final pass is for mopping of loose sludge, lubricate and wipe clean the barrel inner wall followed by image acquisition after cleaning.

The pre cleaning and post cleaning images are then analyzed and processed and the computation of cleaning performance is derived using deep learning and image processing module.

In case where the image processing detects any uncleaned patch with its localized coordinates, the system intelligently generates a selective cleaning sequence to clean the uncleaned patches inside the barrel. Thus the entire cleaning operation is governed by a closed loop control system.

The program then can generate the entire report of cleaning operation and provide traceable evidence and cleaning status of barrel and also indicate the presence of any surface anomaly on the inner wall of barrel.

The time-stamped cleaning data also helps in monitoring the condition of gun barrel to estimate quality and effective service life of gun barrel.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

We claim:

1. An automated system for inspection and cleaning of straight hollow cylindrical objects, the system consisting of:
   a robotic inspection and cleaning device connected to a main controller unit; the robotic inspection and cleaning device comprising:
      a drive wheel assembly located at a rear end of the cleaning device and fitted within a casing, the drive wheel assembly driven by an electrical motor controlled and operated by the main controller unit, the drive wheel assembly having at least one wheel angled with respect to a longitudinal axis of the cleaning device with the outer rim of the wheel in contact with the inner wall of the cylindrical object, for driving the cleaning device linearly along the length of the cylindrical object while rotating spirally along the longitudinal axis of the cleaning device;
      a driven wheel assembly located at the towards front of the cleaning device and fitted within the casing, the driven wheel assembly having at least one wheel angled with respect to the longitudinal axis of the cleaning device with outer rim thereof in contact with inner wall of the cylindrical object;
      a spray nozzle assembly attached next to the driven wheel assembly and operably connected to the main controller unit; the spray nozzle assembly having a plurality of outlet spray nozzles mounted radially on a spray nozzle manifold and fitted with an inlet connector for receiving a cleaning liquid and a lubricating oil respectively, from an externally fitted cleaning liquid reservoir and a lubricating oil reservoir;
      a vision system attached to the front end of the cleaning device and operably connected to the main controller unit, to capture images and real time video footage of the inner wall of the cylindrical object; and
      a cleaning assembly, the cleaning assembly comprising:
      a scrubbing unit and a mopping unit loosely coupled on a slider unit and mounted coaxially with respect to the cleaning device q on a mounting bracket and respectively, wherein the scrubbing unit is operably connected to a jagging subassembly for a controlled reciprocating action thereof; and
      a wiping unit located towards the front end of the cleaning device and attached next to the spray nozzle assembly, wherein mopping brush heads and wiping brush heads are covered by a detachable cloth cap; and
      each of the scrubbing unit, the mopping unit and the wiping unit having:
         a brush unit mounting bracket mounted on a hollow shaft having a sliding element and a slotted disk cam and attached to either side thereof;
         a plurality of brush units, each brush unit from the plurality of brush units mounted on the sliding element by using a slider pin and a guiding socket; and
         a brush actuation motor and a reduction gear train mounted on a mounting bracket on the other side of the brush unit,
   wherein the brush unit corresponding to a specific operation selected from the operations of scrubbing, mopping and wiping is radially opened and closed with respect to the axis of the cleaning device by a sliding motion of the brush unit with respect to the direction of rotation of the slotted disk cam and.

2. The system as claimed in claim 1, wherein the robotic inspection and cleaning device is a cylindrically shaped vehicle body.

3. The system as claimed in claim 1, wherein the main controller unit consists of a microcontroller; a main computer having a central processing module, a graphical processing module, a memory storage module; and a graphical user interface to select the switching, speed controlling and overall programming of the inspection and cleaning operations of the cleaning device.

4. The system as claimed in claim 1, wherein outer rim of the wheels of the drive wheel assembly and the driven wheel assembly are in contact with the inner wall of the cylindrical object according to the inner geometry of the cylindrical object.

5. The system as claimed in claim 1, wherein the angle of twist of the wheel of the drive wheel assembly and the driven wheel assembly is adjusted to the length of the cylindrical object according to the inner geometry of the cylindrical object.

6. The system as claimed in claim 1, wherein the detachable cloth cap is a disposable lint free stretchable cloth cap made up of a stretchable oil and liquid absorbing material.

7. The system as claimed in claim 1, wherein jagging subassembly comprises of a jagging frame connected to a jagging motor through a connecting rod and connected to mounting bracket through connecting members.

8. A method for inspection and cleaning of straight hollow cylindrical objects for generating time-stamped cleaning data to monitor the condition of the cylindrical object and to estimate quality and effective service life of the cylindrical object, the method comprising the steps of:
   connecting cleaning device to a main control unit and inserting it inside the cylindrical object;
   powering ON a drive assembly to drive the cleaning device linearly along the length of the cylindrical object while rotating spirally along a longitudinal axis of the cleaning device thereof and acquiring a plurality of pre-cleaning images of an inner wall of the cylindrical object at plurality of sections travelled by the cleaning device;
   simultaneously spraying a pressurized cleaning liquid radially on the inner wall of the cylindrical object;
   storing the pre-cleaning images in a memory storage module of a main computer of the main controller unit;
   opening a plurality of brush units of a scrubbing unit to press radially to the inner wall of the cylindrical object and linearly reciprocating the scrubbing unit at a high frequency for wet scrubbing of the inner wall of the cylindrical object to remove sludge and sediment;

spraying a pressurized lubricant oil radially on inner wall of the cylindrical object by linearly driving the cleaning device inside the cylindrical object;

opening a plurality of brush units of a wiping unit and a mopping unit, along with lint free stretchable cloth cap, to press radially to the inner wall of the cylindrical object for mopping the sludge and sediment and wiping excess lubricating oil, wherein the mopping and wiping is achieved by a twisted linear motion of the cleaning device;

acquiring a plurality of post-cleaning images of inner wall of the cylindrical object, at plurality of sections travelled by the cleaning device, by driving the cleaning device inside the cylindrical object linearly along the length of cylindrical object while rotating spirally along the longitudinal axis of the cleaning device thereof;

storing the post-cleaning images in the memory storage module of the main computer;

analyzing and processing the pre-cleaning and post cleaning images and deriving the cleaning performance with a central processing module and a graphical processing module of the main computer to detect uncleaned patches;

generating a selective cleaning sequence of scrubbing, mopping and wiping to clean the uncleaned patches; and generating a report of cleaning operation to provide cleaning status of the cylindrical object and indicating the presence of any surface anomaly on the inner wall of the cylindrical object.

9. The method as claimed in claim 8, wherein the cleaning device is driven inside the cylindrical object with a drive wheel assembly located at the rear end and a driven wheel assembly located at the front end of the cleaning device, the drive wheel assembly driven by an electrical motor and controlled by the main controller unit, the drive wheel assembly and the driven wheel assembly having at least one wheel angled with respect to the longitudinal axis of the cleaning device with an outer rim in contact with inner wall of the cylindrical object according to inner geometry of the cylindrical object.

10. The method as claimed in claim 8, wherein the images of inner wall of the cylindrical object are captured by a vision system attached to the front end of the cleaning device and operably connected to the main controller unit, to capture images and real time video footage of inner wall of the cylindrical object.

11. The method as claimed in claim 8, wherein the pressurized cleaning liquid and the pressurized lubricant oil is sprayed using a spray nozzle assembly of the cleaning device.

12. The method as claimed in claim 8, wherein the cleaning liquid is pumped from an external cleaning liquid reservoir via a tubing to a solenoid valve controlled by a pump and valve controller, and further fed to the spray nozzle assembly.

13. The method as claimed in claim 8, wherein the lubricating liquid is pumped from an external lubricating oil reservoir via a tubing to a solenoid valve controlled by a pump and valve controller, and further fed to the spray nozzle assembly.

14. The method as claimed in claim 8, wherein the scrubbing unit is reciprocated by a jagging subassembly controlled by the main controller unit.

\* \* \* \* \*